United States Patent
Ozbaysal

(10) Patent No.: US 11,059,132 B2
(45) Date of Patent: Jul. 13, 2021

(54) STRUCTURAL BRAZE TAPE

(71) Applicant: Siemens Energy, Inc., Orlando, FL (US)

(72) Inventor: Kazim Ozbaysal, Charlotte, NC (US)

(73) Assignee: Siemens Energy, Inc., Orlando, FL (US)

( * ) Notice: Subject to any disclaimer, the term of this patent is extended or adjusted under 35 U.S.C. 154(b) by 720 days.

(21) Appl. No.: 14/851,134

(22) Filed: Sep. 11, 2015

(65) Prior Publication Data

US 2017/0072514 A1  Mar. 16, 2017

(51) Int. Cl.
| | |
|---|---|
| *B23K 35/02* | (2006.01) |
| *B23K 35/30* | (2006.01) |
| *C22C 19/05* | (2006.01) |
| *B23K 35/36* | (2006.01) |
| *B23K 35/362* | (2006.01) |
| *B32B 7/12* | (2006.01) |
| *B32B 15/08* | (2006.01) |
| *C22C 19/03* | (2006.01) |

(52) U.S. Cl.
CPC ...... *B23K 35/0238* (2013.01); *B23K 35/0244* (2013.01); *B23K 35/304* (2013.01); *B23K 35/3033* (2013.01); *B23K 35/362* (2013.01); *B23K 35/3605* (2013.01); *B32B 7/12* (2013.01); *B32B 15/08* (2013.01); *C22C 19/03* (2013.01); *C22C 19/058* (2013.01)

(58) Field of Classification Search
CPC ............ B23K 35/0238; B23K 35/0244; B23K 35/3033; B23K 35/304; B23K 35/3613; B23P 6/005; B23P 6/007; B23P 6/045
See application file for complete search history.

(56) References Cited

U.S. PATENT DOCUMENTS

| | | | |
|---|---|---|---|
| 2,906,008 A * | 9/1959 | Boegehold | B23K 35/005 228/194 |
| 4,614,296 A * | 9/1986 | Lesgourgues | B22F 1/0003 228/119 |
| 5,952,042 A | 9/1999 | Rafferty et al. | |
| 6,004,683 A * | 12/1999 | Rafferty | B23K 35/0233 29/402.07 |
| 6,093,368 A | 7/2000 | Rafferty et al. | |
| 6,416,709 B1 * | 7/2002 | Rafferty | B23K 35/0233 419/36 |

(Continued)

FOREIGN PATENT DOCUMENTS

| | | |
|---|---|---|
| CN | 1066014 A | 11/1992 |
| CN | 101480761 A | 7/2009 |

(Continued)

OTHER PUBLICATIONS

Otobe, JP 3190985 U, Machine Translation (Year: 2014).*

(Continued)

*Primary Examiner* — Monique R Jackson

(57) ABSTRACT

A braze tape (12) useful with superalloy materials. In one embodiment, the tape includes a layer (14) containing superalloy powder (22) in a binder (24), and a layer (16) containing boron and silicon free braze material powder (32) in a binder, joined together by a layer (18) of double-sided adhesive fluorocarbon polymer tape, such as a double-sided adhesive polytetrafluoroethylene or Teflon® tape (46).

2 Claims, 3 Drawing Sheets

(56) References Cited

U.S. PATENT DOCUMENTS

| | | | |
|---|---|---|---|
| 7,411,204 B2* | 8/2008 | Appleby | G21K 1/025 |
| | | | 250/505.1 |
| 8,932,728 B2 | 1/2015 | Matsumoto et al. | |
| 2004/0056071 A1 | 3/2004 | Pohlman | |
| 2009/0014505 A1 | 1/2009 | Cretegny et al. | |
| 2010/0038412 A1* | 2/2010 | Huang | B23K 35/3033 |
| | | | 228/262.9 |
| 2013/0156555 A1 | 6/2013 | Budinger et al. | |
| 2014/0007988 A1 | 1/2014 | Ozbaysal | |

FOREIGN PATENT DOCUMENTS

| | | | | |
|---|---|---|---|---|
| CN | 101992331 A | 3/2011 | | |
| CN | 102581517 A | 7/2012 | | |
| CN | 103305724 A | 9/2013 | | |
| CN | 103537821 A | 1/2014 | | |
| EP | 1004390 A1 | 5/2000 | | |
| EP | 2193873 A2 | 6/2010 | | |
| JP | S63011604 A | 1/1988 | | |
| JP | 2000153394 A | 6/2000 | | |
| JP | 2002160091 A | 6/2002 | | |
| JP | 2009090330 A | 4/2009 | | |
| JP | 3190985 U * | 6/2014 | | |
| JP | 2014213371 A | 11/2014 | | |
| RU | 2068759 C1 | 11/1996 | | |
| RU | 2515157 C1 | 5/2014 | | |
| SU | 1743773 A1 | 6/1992 | | |
| WO | WO-2013067341 A2 * | 5/2013 | | B23K 1/0018 |
| WO | WO-2014143963 A1 * | 9/2014 | | B23K 35/325 |
| WO | WO-2014197087 A2 * | 12/2014 | | F01D 5/282 |

OTHER PUBLICATIONS

CS Hyde, Double Sided PTFE Tape, Aug. 1, 2010, p. 1, https://catalog.cshyde.com/viewitems/tapes-with-psa/egories-tapes-with-adhesive-double-sided-ptfe-tape (Year: 2010).*

PCT International Search Report and Written Opinion dated Sep. 29, 2016 corresponding to PCT Application No. PCT/US2016/046500 filed Aug. 11, 2016 (14 pages).

* cited by examiner

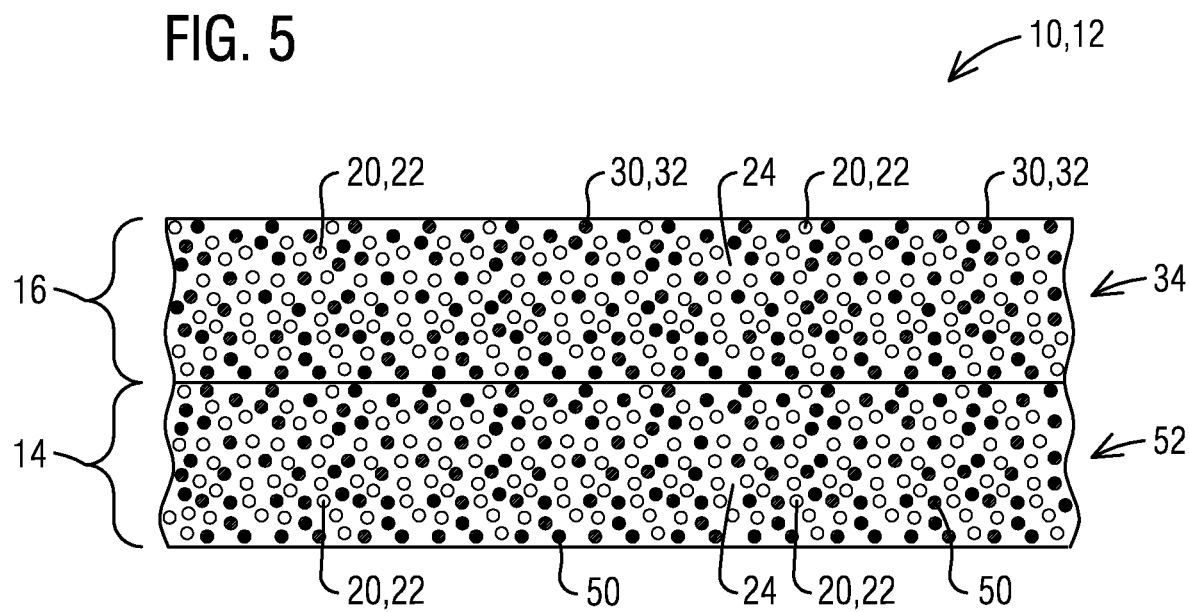

STRUCTURAL BRAZE TAPE

FIELD OF THE INVENTION

The invention relates to a structural braze tape suitable for use with gas turbine engine components formed of superalloy material, including tapes having a layer of Ni—Cr—Ti or Ni—Zr—Ti or Ni—Cr—Zr—Ti, as examples.

BACKGROUND OF THE INVENTION

Braze materials may be used in the production and repair of gas turbine engine components, including those having nickel or cobalt based superalloy materials. For example, a braze foil, slurry, or a braze tape etc. may be applied to a component where damage has occurred. The assembly is heated and then cooled to produce a braze-repaired component. However, conventional boron or silicon braze repairs are known to have relatively lower structural strength when compared to that of the original component. This is due, in part, to the composition of the braze alloys. In addition, dimensional control of the repaired area is difficult when a slurry is used due to the amorphous nature of the slurry. Consequently, there remains room in the art for improvement.

BRIEF DESCRIPTION OF THE DRAWINGS

The invention is explained in the following description in view of the drawings that show:

FIG. 5 is a schematic cross section of an alternate exemplary embodiment of the structural braze tape disclosed herein.

DETAILED DESCRIPTION OF THE INVENTION

The present inventor has developed a structural braze media having a composition that enables repairs of nickel and cobalt based superalloys. The composition is free of boron and silicon and their weakening effects in some embodiments. In addition, the composition may include a fluxing agent that cleanses impurities during the brazing operation, thereby producing a repaired part with fewer impurities and associated weaknesses. The structural braze media may take the shape of a braze tape that is more flexible than a foil, which allows for better conformity of the braze tape to the component, and more cohesive than a slurry, which enables better dimensional control of the repair.

Figure 1:
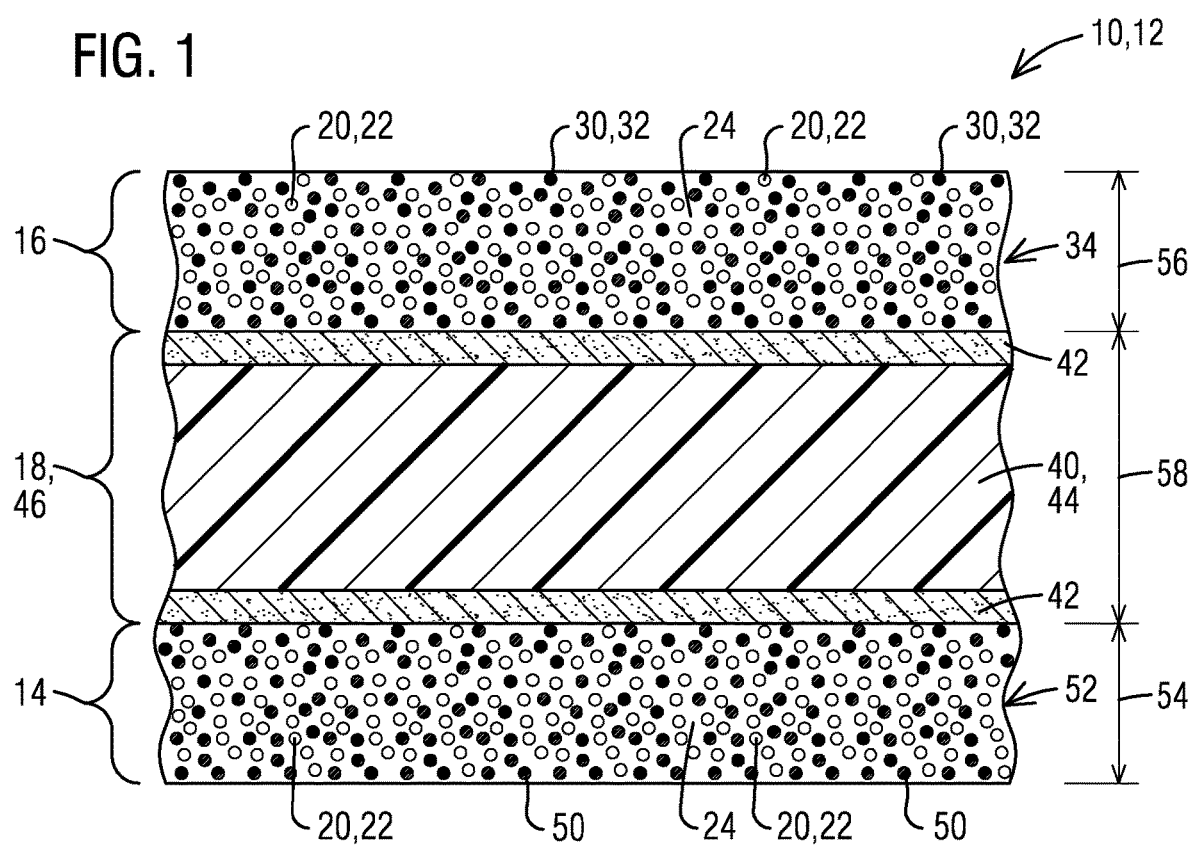
FIG. 1 is a schematic cross section of an exemplary embodiment of the structural braze tape disclosed herein.

FIG. 1 is a schematic cross section of an exemplary embodiment of a structural braze media 10 embodied as a structural braze tape 12 having an alloy layer 14, a braze material layer 16, and a flux layer 18 there between. The alloy layer 14 includes an alloy 20 such as, for example, a nickel or cobalt based superalloy, and the alloy 20 may be embodied as an alloy powder 22 or take any suitable form known to those in the art. The alloy layer 14 may also include a binder 24 such as an acrylic binder or a gelatin-based binder.

Embodying the structural braze media 10 as a tape enables a greater amount of contouring/shaping of the tape than other forms such as a less-flexible foil would permit. This is advantageous when the structural braze tape 12 is to be applied to highly contoured components to which a foil might not be able to fully contour. In addition, it is difficult, if not impossible, to form superalloys into a foil. Accordingly, in exemplary embodiments the when the alloy layer 14 includes a superalloy, tape provides a solution.

The braze material layer 16 includes braze material 30 that may be embodied as a braze material powder 32 (or take any suitable form known to those in the art) and optionally a binder 24 such as an acrylic binder or a gelatin-based binder. The braze material layer 16 may also optionally include additional alloy 20 such as the alloy powder 22. In this exemplary embodiment the braze material layer 16 includes a mixture 34 of the braze material powder 32 and the alloy powder 22 in the binder 24. The braze material is boron free in embodiments, for example chemical compositions of braze materials including Ni—Cr—Ti, Ni—Cr—Ti—Zr, or Ni—Ti—Zr. Suitable braze materials are disclosed in United States Patent Application Publication number US 2014/0007988 A1 which is incorporated by reference in its entirety herein. When these braze materials are used, a braze joint made with the tape 12 can achieve a structural strength approaching that of the adjoined superalloy substrate. Consequently, the structural braze tape 12 disclosed herein is capable of more than just cosmetic braze repairs of parts, but is capable of repairing and/or creating brazed components of a similar structural integrity as the base component.

The flux layer 18 includes a flux material 40 and adhesive 42. The flux material 40 includes, at a minimum, fluoride. The fluoride may be part of a fluorocarbon polymer 44, including but not limited to polytetrafluoroethylene (PTFE) and/or polyvinyltetrafluoride. The fluoride in these fluorocarbon polymers 44 acts as a fluxing agent and helps cleanse the braze operation. While both polytetrafluoroethylene and polyvinyltetrafluoride include carbon and fluoride, polyvinyltetrafluoride additionally includes hydrogen. The fluoride and the hydrogen combine to form hydrogen fluoride (hydrofluoric acid), which is also an effective cleansing agent. The flux layer 18 may volatize at a temperature lower than the braze temperature and then precipitate out as the environment cools. For example, the flux layer 18 may volatize around 1200 degrees Fahrenheit and the highest braze temperature may be approximately 2200 degrees Fahrenheit. The precipitation of hydrofluoric acid may require the addition of a base to neutralize any acid that may precipitate on, for example, surfaces of a braze oven or the component itself. The polytetrafluoroethylene and polyvinyltetrafluoride may be embodied as a resin having non-fibrillated polymers.

The adhesive 42 may be any adhesive known to those in the art such as, for example, an acrylic binder etc. In an exemplary embodiment the fluorocarbon polymer 44 and the adhesive 42 take the form of a doubled-sided adhesive fluoropolymer tape 46, such as double sided adhesive Teflon® tape (PTFE tape) as may be purchased from CS Hyde Company of Lake Villa, Ill. (cshyde.com).

Optionally, the alloy layer 14 may include flux material 40 such as fluoride. In an exemplary embodiment the flux material 40 may be embodied as a flux powder 50 such as, for example, polytetrafluoroethylene powder or polyvinyltetrafluoride powder etc. In the exemplary embodiment shown the alloy layer 14 includes a mixture 52 of the alloy powder 22 and the flux powder 50.

In an alternate exemplary embodiment the alloy layer 14 is free of the binder 24. In this exemplary embodiment a thickness 54 of the alloy layer 14 is limited to that which can be achieved when the alloy powder 22 or the mixture 52 is secured to the flux layer 18 solely by the adhesive 42. Likewise, in an alternate exemplary embodiment, the braze material layer 16 is free of the binder 24. In this exemplary embodiment a thickness 56 of the braze material layer 16 is limited to that which can be achieved when the braze material powder 32 or the mixture 34 is secured to the braze material layer 16 solely by the adhesive 42.

Conventionally, powders may be available in diameters of approximately 0.001 inches thick and above. Accordingly, the alloy layer 14 and/or the braze material layer 16 may be as thin as 0.001 inches when no binder 24 is present and the particles adhere to the adhesive 42. In an exemplary embodiment, the thickness 54 of the alloy layer 14 may be from 0.010 inches to 0.040 inches. The thickness 56 of the braze material layer 16 may be from 010 inches to 0.040 inches. A thickness 58 of the flux layer 18 may be approximately 0.010 inches. Though these dimensions have been found to be beneficial in some instances, other dimensions may be used as necessary.

Figure 2:
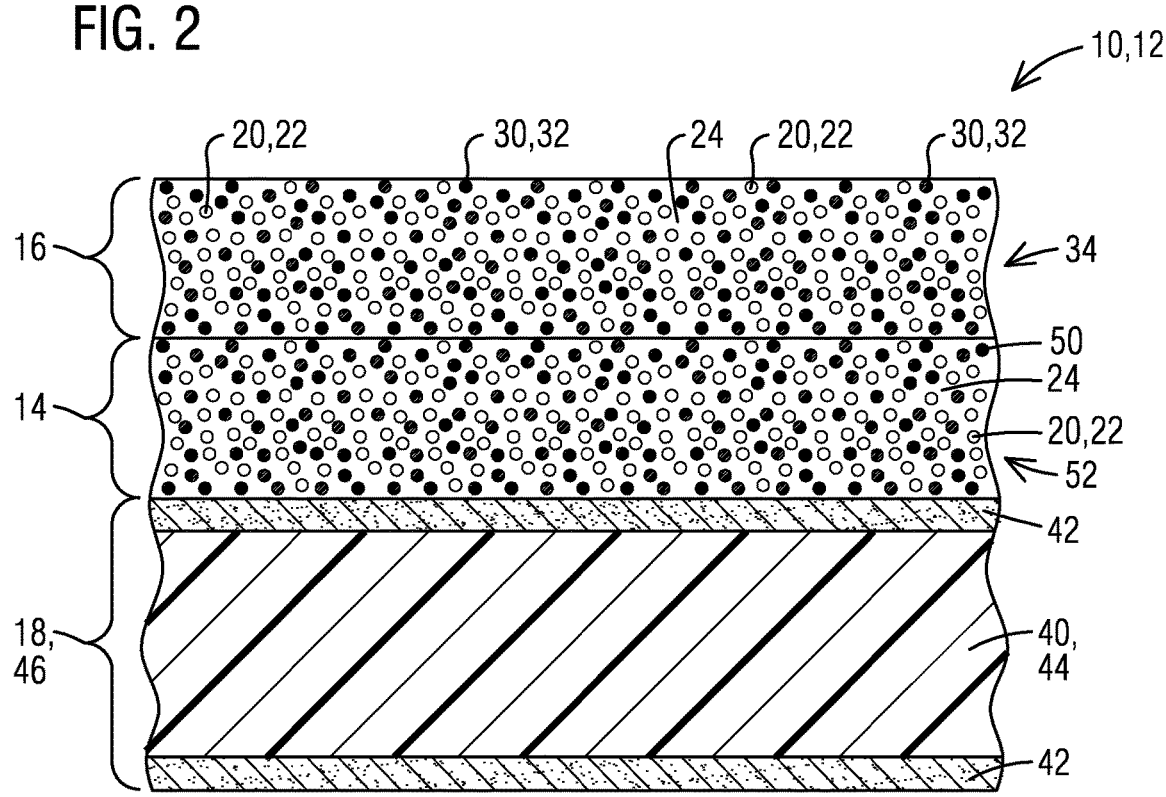
FIG. 2 is a schematic cross section of an exemplary embodiment of the structural braze tape disclosed herein.

The relative location of the alloy layer 14, the braze material layer 16, and the flux layer 18 within the structural braze tape 12 is interchangeable in other embodiments. For example, in an alternate exemplary embodiment the alloy layer 14 and the braze material layer 16 may be adjacent each other and the flux layer 18 may be adjacent either the braze material layer 16 or the flux layer 18. FIG. 2 shows an alternate exemplary embodiment of the structural braze media 10 embodied as the structural braze tape 12 where the alloy layer 14 and the braze material layer 16 are adjacent each other, and the flux layer 18 is adjacent the alloy layer 14. When the flux layer includes the doubled-sided adhesive tape 46, the doubled-sided adhesive tape 46 may then be secured to a substrate (not shown) to be brazed. In a variation, the flux layer 18 may be disposed adjacent to the braze material layer 16. There may be one or more than one of each layer and the layers may be embodied in any order.

Figure 3:
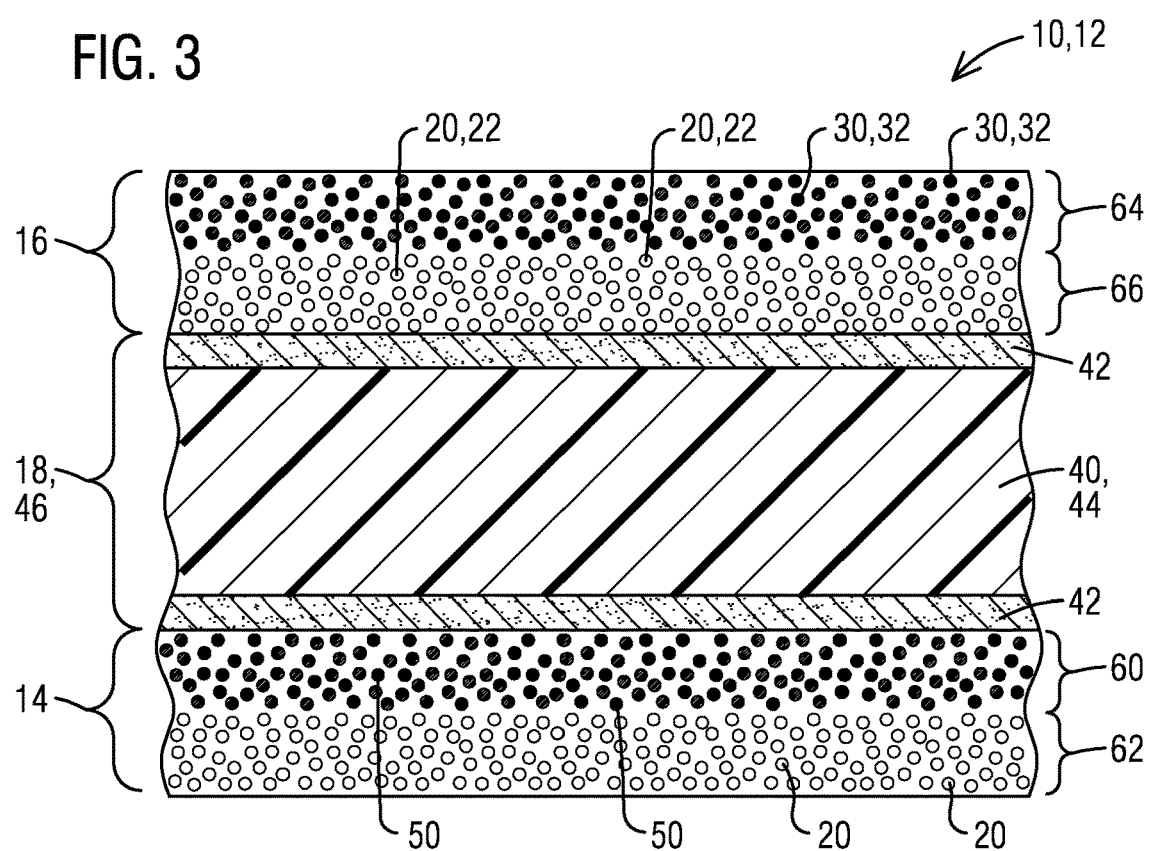
FIG. 3 is a schematic cross section of an alternate exemplary embodiment of the structural braze tape disclosed herein.

FIG. 3 shows an alternate exemplary embodiment of the structural braze media 10 embodied as the structural braze tape 12 having the alloy layer 14, the braze material layer 16, the flux layer 18 there between, and the adhesive 42. In this exemplary embodiment, instead of the alloy layer 14 having the mixture 52, there is a discrete layer 60 of the flux powder 50 disposed atop a discrete layer 62 of alloy powder 22. The relative positions of these layers 60, 62 may be switched, and there may be more than one of one or both of these layers 60, 62. Similarly, instead of the braze material layer 16 having the mixture 34, there is a discrete layer 64 of the braze material powder 32 atop a discrete layer 66 of the alloy powder 22. The relative positions of these layers 64, 66 may be switched, and there may be more than one of one or both of these layers 64, 66.

Figure 4:
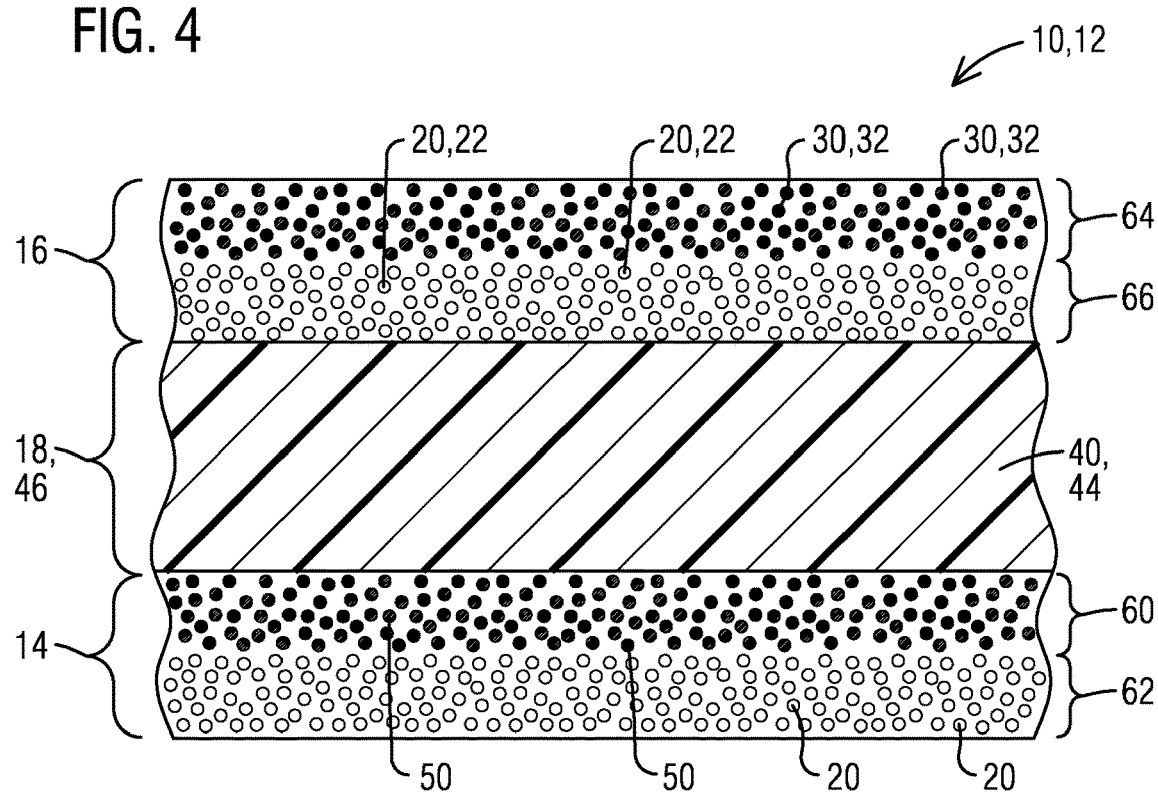
FIG. 4 is a schematic cross section of an alternate exemplary embodiment of the structural braze tape disclosed herein.

FIG. 4 shows an alternate exemplary embodiment of the structural braze media 10 embodied as the structural braze tape 12 having the alloy layer 14, the braze material layer 16, and the flux layer 18 having the fluoride there between. In this exemplary embodiment the adhesive 42 is not present. The layers present may be held together through a mechanical process such as, for example, where all three layers are pressed together between opposing rollers or by sintering.

FIG. 5 shows an alternate exemplary embodiment of the structural braze media 10 embodied as the structural braze tape 12 having the alloy layer 14, and the braze material layer 16. The braze layer 16 may be boron free, and the alloy may include a nickel or cobalt based superalloy. Powders 22, 32, 50 may be held with binder 24 to form the tape 12.

From the foregoing it can be understood that the inventor has developed a novel structural braze tape that provides a braze having improved structural properties, that provides for improved cleaning of the braze, and that comes in a convenient, easy to form, and easy to contour form.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A braze tape for the repair of a gas turbine component comprising a nickel or cobalt based superalloy, the braze tape comprising:
   a first layer comprising a mixture of boron-free and silicon-free braze material powder and a powder of the nickel or cobalt based superalloy disposed over a second layer comprising the nickel or cobalt based superalloy material powder in a binder, wherein the braze material powder consists of a chemical composition consisting of Ni—Cr—Ti,
   wherein said nickel is present in an amount of approximately 60 weight percent of the chemical composition, said titanium is present in an amount of approximately 20 weight percent of the chemical composition and said chromium is present in an amount of approximately 20 weight percent of the chemical composition, and
   wherein the binder is an acrylic binder or a gelatin-based binder.

2. The braze tape of claim 1, further comprising a double sided adhesive fluorocarbon polymer tape disposed between and adhered to the first layer and the second layer.

* * * * *